(12) United States Patent
Lohr

(10) Patent No.: US 9,912,188 B2
(45) Date of Patent: Mar. 6, 2018

(54) CHARGING DEVICE

(71) Applicant: Robert Bosch GmbH, Stuttgart (DE)

(72) Inventor: Guenter Lohr, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 14/952,818

(22) Filed: Nov. 25, 2015

(65) Prior Publication Data
US 2017/0149267 A1   May 25, 2017

(51) Int. Cl.
*H02J 7/02* (2016.01)
*H02J 7/00* (2006.01)
*H02J 7/04* (2006.01)

(52) U.S. Cl.
CPC ............ *H02J 7/025* (2013.01); *H02J 7/0042* (2013.01); *H02J 7/04* (2013.01)

(58) Field of Classification Search
CPC ....................................... H02J 7/025
USPC ......................................................... 320/108
See application file for complete search history.

(56) References Cited

U.S. PATENT DOCUMENTS

2013/0208519 A1* 8/2013 Yamamoto ............. H02M 7/12
                                                                    363/67

* cited by examiner

*Primary Examiner* — Thuan Do
(74) *Attorney, Agent, or Firm* — Maginot, Moore & Beck LLP

(57) ABSTRACT

The invention is based on a charging device, in particular for a hand tool accumulator (12), with at least one inductive voltage source (14) that is provided for supplying a charging current and comprises a first AC voltage connection point (16) and at least one further AC voltage connection point (18), with an inverter (20) comprising at least one power output (22) and at least one inverter element (24) which is electrically connected to the first AC voltage connection point (16), and with a signal transfer unit (26).
It is proposed that the signal transfer unit (26) is provided for short-circuiting the at least two AC voltage connection points (16, 18) to generate a signal.

9 Claims, 1 Drawing Sheet (1)

CHARGING DEVICE

STATE OF THE ART

Figure 1:
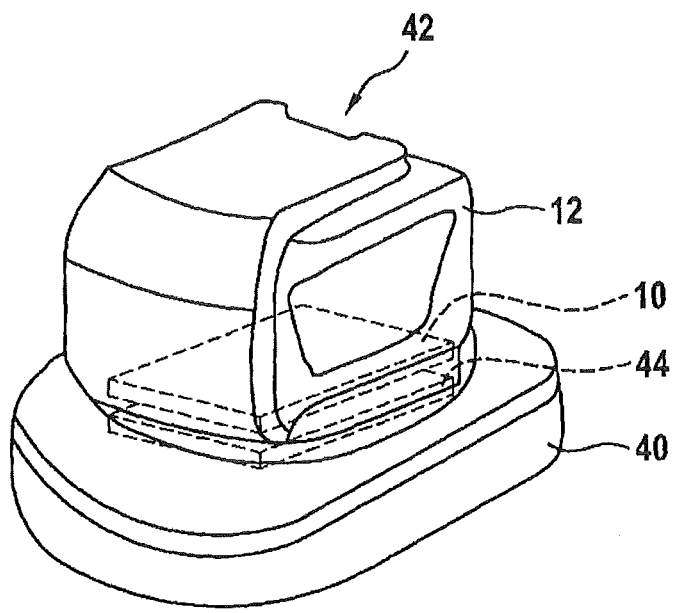

A charging device, with at least one induction voltage source that is provided for supplying a charging current and comprises a first AC voltage connection point and at least one further AC voltage connection point, with an inverter comprising at least one power output and at least one inverter element which is electrically connected to the first AC voltage connection point, and with a signal transfer unit, has already been proposed.

DISCLOSURE OF THE INVENTION

The invention is based on a charging device, in particular for a handheld-tool accumulator, with at least one inductive voltage source that is provided for supplying a charging current and comprises a first AC voltage connection point and at least one further AC voltage connection point, with an inverter comprising at least one power output and at least one inverter element which is electrically connected to the first AC voltage connection point, and with a signal transfer unit.

It is proposed that the signal transfer unit is provided for short-circuiting the at least two AC voltage connection points to generate a signal. As a result of this, a particularly low resistance can be achieved in a short-circuit path. Thus, a particularly efficient signal transfer can be achieved. A "signal transfer unit" is to be understood, in this context, in particular as a unit which, in at least one operating state, transfers a signal of the charging device onto an inductive charger for controlling the inductive charger. A "charging device" is to be understood, in this context, in particular, a device which is provided to receive energy from an inductive charge for a charging process of an energy store. An "inductive voltage source" is to be understood, in tris context, in particular as a unit that is provided for converting, in at least one operating state, an energy of an electromagnetic alternating field into a charging current and for supplying an AC voltage between at least two AC voltage connection points. An "inverter" is to be understood, in this context, in particular as a unit that is provided for converting, in at least one operating state, an AC current into a DC current and for providing a DC voltage between at least two power outputs. An "inverter element" is to be understood, in this context, in particular as an element having a polarity-dependent resistance at least in a voltage range around a zero point. Preferably a resistance of the inverter element in a conducting direction of the polarity above a threshold voltage amounts to a traction of a resistance in a reverse direction of the polarity. Preferentially the inverter element is embodied as a semiconductor diode, while other diode types are also conceivable. "Provided" is to mean, in particular, specifically programmed, designed and/or equipped. By an object being provided for a certain function is to be understood, in particular, that the object fulfills and/or implements said certain function in at least one application state and/or operating state.

In an advantageous implementation the signal transfer unit comprises at least one switching element that is provided to establish, in at least one operating state, a by-pass parallel to the inverter element. Thereby a signal can be generated even in case of a low voltage of the inductive voltage source, in particular in case of a voltage lower than a forward voltage of the inverter element. A particularly reliable signal transfer is achievable. "Parallel" is to mean, in this context, in particular connected in parallel. By the switching element "establishing a by-pass" is to be understood, in this context, in particular that the switching element establishes an electric connection that is at least substantially resistance-free independently from a current direction.

Advantageously the inverter comprises at least one further inverter element, which is connected to the further AC voltage connection point, and the signal transfer unit comprises at least one further switching element, which is provided for establishing a further by-pass parallel to the at least one further inverter element in at least one operating state. This allows a short-circuit path to be established, free of inverter elements, via the inductive voltage source. A particularly precise signal transfer is achievable. "Connected" s to mean, in this context, in particular connected in an electrically conductive manner.

It is moreover proposed that the by-pass is arranged between the first AC voltage connection point and the at least one power output. Thereby an especially simple switching structure is achievable. Preferably the by-pass is provided for connecting, in at least one operating state, the first AC voltage connection point and the at least one power output in an electrically conductive manner, independently from a current direction.

Advantageously the further by-pass is arranged between the further AC voltage connection point and the at least one power output. Thus a short-circuit path tree of inverter elements can be established particularly easily. A reliability of the signal transfer is further increasable. The signal transfer can be used particularly easily for a secure and/or reliable charging process.

Furthermore, it is proposed that the signal transfer unit comprises a control unit, which is provided for controlling a switching process of the at least one switching element for generating a signal. A "control unit" is to be understood. In particular, as a unit with at least one control electronics. By "control electrode" is to be understood, in particular, a unit with a processor unit and with a storage unit as well as with an operating program stored in the storage unit. Preferably the control unit is provided for controlling a switching process of the at least one further switching element to generate a signal. Preferentially the control unit is provided to switch the at least two switching elements at least substantially simultaneously.

In an advantageous embodiment the signal transfer unit is provided to encrypt a signal transfer. Thereby a signal transfer can be protected from unauthorized access in a particularly efficient manner. A product identification is achievable.

In an advantageous embodiment, furthermore, the at least one inverter element is implemented as a Schottky diode. Thereby a particularly short switch ng time of the inverter element is achievable. A particularly efficient charging device can be made available. As an alternative, it is conceivable that the inverter element is embodied as another diode type, in particular as another type of semiconductor diode.

It is moreover proposed that the at least one switching element is embodied as a MOSFET. Thereby a particularly short switching time of the switching element is achievable. It is achievable that a resistance in a short-circuit path is defined at least substantially by a drain-to-source resistance of the at least one switching element.

Standard components may be used. A particularly cost-efficient charging device can be made available. As an alternative, the switching element may be implemented as another component that is deemed expedient by the person skilled in the art, e.g. as an other type of transistor.

Furthermore, a hand tool accumulator is proposed with a charging device according to the invention. On account of this an especially efficient hand tool accumulator can be made available. A "hand tool accumulator" is to be understood, in this context, in particular as an energy storage unit for a hand machine tool, which is provided for supplying a hand machine tool, in particular a drive unit of the hand machine tool, with electric power. A "hand machine tool" is to be understood, in this context, in particular as a workpiece-processing machine, advantageously however as a drilling machine, a drill and/or impact hammer, a saw, a plane, a screwdriver, a milling machine, a grinder, an angle grinder, a garden tool and/or a multi function tool. As an alternative, the hand tool accumulator may also be provided for supplying a household apparatus, e.g. a hoover, with electric power.

Furthermore, a method is proposed for a signal transfer between an inductive charger and a charging device, in particular a charging device for a hand tool accumulator, which comprises at least one inductive voltage source that is provided to supply a charging current and comprises a first AC voltage connection point and at least one further AC voltage connection point, wherein a signal transfer unit short-circuits the at least two AC voltage connection points of the induction voltage source to generate a signal. This allows achieving a particularly simple and robust signal transfer. In particular, the method is provided for a signal transfer from the charging device to the inductive charger.

The charging device according to the invention is herein not to be limited to the application and implementation described above. In particular, to the purpose of fulfilling the functionality herein described, the charging device according to the invention may comprise a number of individual elements, components and units that differs from the number herein mentioned.

DRAWING

Further advantages may be taken from the following description of the drawing. In the drawing one exemplary embodiment of the invention is shown. The drawing, the description and the claims contain a plurality of features in combination. The person skilled in the art will expediently also consider the features separately and will find further purposeful combinations.

Figure 2:
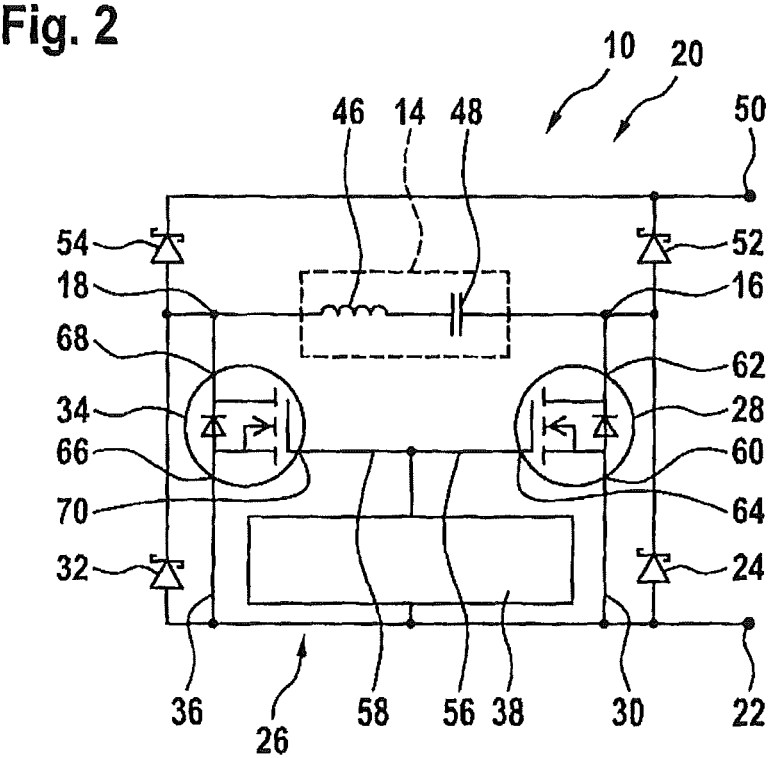

It is shown in:

FIG. 1 an inductive charger and a hand tool accumulator with a charging device according to the invention, and in FIG. 2 a wiring diagram of the charging device.

DESCRIPTION OF THE EXEMPLARY EMBODIMENT

FIG. 1 shows an inductive charger 40 and a hand tool accumulator 12. The hand tool accumulator 12 is provided for supplying a hand machine tool (not shown in detail) with energy. The hand tool accumulator 12 comprises an interface unit 42, which is provided for coupling the hand tool accumulator 2 with the hand machine tool electrically and mechanically. As an alternative, the hand tool accumulator can also be integrated in the hand machine tool. The Inductive charger 40 is provided to transfer an electric energy wirelessly to the hand tool accumulator 12 by way of an electro-magnetic alternating field. The hand tool accumulator 12 comprises a charging device 10. The inductive charger 40 comprises a charging device 44, which is provided to transfer an electric energy wirelessly to the charging device 10 of the hand tool accumulator 12 by way of an electro-magnetic alternating field.

FIG. 2 shows a wiring diagram of the charging device 10 of the hand tool accumulator 12, with an inductive voltage source 14 that is provided to supply a charging current. The inductive voltage source 14 comprises a first AC voltage connection point 16 and a further AC voltage connection point 1. The inductive voltage source 14 comprises an oscillating circuit. The oscillating circuit of the inductive voltage source 14 comprises a coil 46. The coil 6 of the inductive voltage source 14 is embodied as a receiving coil. The oscillating circuit of the inductive voltage source 14 comprises a capacitor 48. The capacitor 48 of the inductive voltage source 14 is embodied as a resonant capacitor. The capacitor 48 is provided for adjusting a resonant frequency of the oscillating circuit. The capacitor 48 is directly connected to the first AC voltage connection point 16. The coil 46 is directly connected to the further AC voltage connection point 18. The inductive voltage source 14 converts, in an operating state, a field energy of the electromagnetic alternating field generated by the inductive charger 40 into an electric AC current. The inductive voltage source 14 converts, in an operating state, a field energy of an electromagnetic alternating field into an electric AC voltage that can be tapped on the AC voltage connection points 16, 18.

The charging device 10 comprises an inverter 20 with a positive power output 50 and with a negative power output 22. The inverter 20 converts, in an operating state, the electric AC current supplied by the inductive voltage source 14 into a DC current. The inverter 20 converts, in an operating state, the electric AC voltage provided by the inductive voltage source 14 into an electric DC voltage that can be tapped at the power outputs 22, 50. The inverter 20 comprises an inverter element 24, which is electrically connected to the first AC voltage connection point 16.

The charging device 10 comprises a signal transfer unit 26, which is provided for short-circuiting the two AC voltage connection points 16, 18 to generate a signal. The charging device 10 is provided to act together with the inductive charger 40. In a method for a signal transfer between the inductive charger 40 and the charging device 10, the inductive charger 40 provides, in an operating state, an electro-magnetic alternating field that induces a voltage in the coil 46 of the inductive voltage source 14. The AC voltage is applied between the AC voltage connection points 16, 18 of the inductive voltage source 14.

The signal transfer unit 26 is provided for periodically changing a load impedance of the inductive voltage source 14. By means of the switching arrangement the load impedance can be reduced to almost zero Ohm. The change in the lead impedance can be transferred to a primary side, i.e. onto the inductive charger 40, via a magnetic coupling, and can be evaluated there. The signal transfer unit 26 short-circuits the two AC voltage connection points 16, 18 of the inductive voltage source 14 to generate a signal. The signal transfer unit 26 establishes a bypass 30 parallel to the inverter element 24 by means of a first switching element 28, and establishes simultaneously a further bypass 36 parallel to a further inverter element 32 by means of a further switching element 34. The signal transfer unit 26 short-circuit the AC voltage connection points 16, 18 in a pulsed manner, thus generating a signal that is captured and evaluated by the inductive charger 40. A short-circuit current, changing the electro-magnetic alternating field In a pulsed manner, flows through the cell 46. The pulsed changes of the electromagnetic alternating field form a signal. The inductive charger 40 captures the pulsed changes of the alternating field and receives the signal. The charging device 10 and the inductive charger 40 exchange information via a signal transfer. The signal transfer unit 26 is provided to encrypt the signal transfer. A control unit 36 of the signal transfer unit 26 is provided for storing an encrypting routine and for converting an information that is to be transferred into an encrypted signal via the encrypting routine.

The signal transfer unit 26 comprises the switching element 28, which is provided for establishing, in at least one operating state, the bypass 30 parallel to the first inverter element 24. The inverter element 24 is arranged between the first AC voltage connection point 16 and the negative power output 22. The inverter element 24 is arranged between the capacitor 48 of the inductive voltage source 14 and the negative power output 22. The inverter element 24 has a conducting direction from the negative power output 22 to the first AC voltage connection point 16. The inverter element 24 has an inverse direction that is oriented counter to the conducting direction. The switching element 28 is arranged between the first AC voltage connection point 16 and the negative power output 22 of the inverter 20. The switching element 28 conductively connects, in a closed state, the first AC voltage connection point 16 to the negative power output 22 of the inverter 20. The bypass 30 is arranged between the first AC voltage connection point 16 and the negative power output 22.

The inverter 20 comprises the further inverter element 32, which is connected to the further AC voltage connection point 18. The signal transfer unit 26 comprises the further switching element 34 which establishes, in an operating state, the further bypass 36 parallel to the further inverter element 32. The further inverter element 32 is arranged between the further AC voltage connection point 18 and the negative power output 22. The further inverter element 32 is arranged between the coil 46 of the inductive voltage source 14 and the negative power output 22. The further inverter element 32 has a conducting direction from the negative power output 22 to the further AC voltage connection point 18. The further inverter element 32 has an inverse direction that is oriented counter to the conducting direction. The further switching element 34 is arranged between the further AC voltage connection point 18 and the negative power output 22 of the inverter 20. The further switching element 34 conductively connects, in a closed state, the further AC voltage connection point 18 to the negative power output 22 of the inverter 20. The further bypass 36 is arranged between the further AC voltage connection point 18 and the negative power output 22. The signal transfer unit 26 establishes, in an operating state, a short-circuit path between the AC voltage connection points 16, 18. The short-circuit path comprises the bypass 30 and the bypass 36, and leads from the first AC voltage connection point 16 to the further AC voltage connection point 18 via the switching element 28 and the further switching element 34.

The inverter 20 comprises a third inverter element 52. The third inverter element 52 is arranged between the first AC voltage connection point 16 and the positive power output 50 of the inverter 20. The third inverter element 52 is arranged between the capacitor 48 of the inductive voltage source 14 and the positive power output 50. The third inverter element 52 has a conducting direction from the first AC voltage connection point 16 to the positive power output 50. The third inverter element 52 has an inverse direction that is oriented counter to the conducting direction. The inverter 20 comprises a fourth inverter element 54. The fourth inverter element 54 is arranged between the further AC voltage connection point 18 and the positive power output 50 of the inverter 20. The fourth inverter element 54 is arranged between the coil 46 of the inductive voltage source 14 and the positive power output 50. The fourth inverter element 54 has a conducting direction from the further AC voltage connection point 18 to the positive power output 50. The fourth inverter element 54 has an inverse direction that is oriented counter to the conducting direction.

In an alternative implementation the switching element 28 may be provided for establishing a bypass parallel to the third inverter element 62, and the further switching element 34 may be provided for establishing a bypass parallel to the fourth inverter element 54. In such an implementation the switching element 28 is arranged between the first AC voltage connection point 18 and the positive power output 50 of the inverter 20, and the further switching element 34 is arranged between the further AC voltage connection point 18 and the power output 50 of the inverter 20.

The signal transfer unit 26 comprises the control unit 38, which is provided for controlling a switching process of the switching element 28 to generate a signal. The control unit 38 is provided for controlling a switching process of the further switching element 34 to generate a signal. The charging device 10 comprises a first signal line 56, which connects the control unit 38 of the signal transfer unit 26 to the first switching element 20. The charging device 10 comprises a further signal line 58, which connects the control unit 38 of the signal transfer unit 26 to the further switching element 34.

The inverter element 24 is embodied as a Schottky diode. The further inverter element 32, the third inverter element 52 and the fourth inverter element 54 are respectively also embodied as a Schottky diode. The switching element 28 is embodied as a MOSFET. The further switching element 34 is also embodied as a MOSFET. The switching elements 28, 34 are respectively embodied as a normally open n-channel MOSFET. The first switching element 28 comprises a source connection 50, which is connected to the negative power output 22 of the inverter 20. The first switching element 28 comprises a drain connection 62, which is connected to the first AC voltage connection point 16. The first switching element 28 comprises a gate connection 64, which is connected to the control unit 38 of the signal transfer unit 26 via the first signal line 56. The further switching element 34 comprises a source connection 66, which is connected to the negative power output 22 of the inverter 20. The further switching element 34 comprises a drain connection 88, which is connected to the further AC voltage connection point 18. The further switching element 34 comprises a gate connection 70, which is connected to the control unit 38 of the signal transfer unit 26 via the further signal line 58.

The invention claimed is:

1. A hand tool accumulator comprising:
   an energy store;
   at least one inductive voltage source configured to supply a charging current transferred wirelessly by a charging device of an inductive charger;
   a first AC voltage connection point and at least one further AC voltage connection point, wherein the inductive voltage source converts, in an operating state, a field energy of an electromagnetic alternating field into an electric AC voltage that can be tapped on the AC voltage connection points;
   an inverter including at least one power output and at least one inverter element electrically connected to the first AC voltage connection point, wherein the inverter converts, in an operating state, the electric AC voltage into an electric DC voltage for charging of the energy store; and a signal transfer unit configured to periodically change a load impedance of the inductive voltage source by short-circuiting the first AC voltage connection point to the at least one further AC voltage connection point in a pulsed manner to generate a signal that is captured and evaluated by the inductive charger.

2. The charging device according to claim 1, wherein the signal transfer unit includes at least one switching element configured to establish in at least one operating state a bypass parallel to the at least one inverter element.

3. The charging device according to claim 2, wherein:
the inverter further includes at least one further inverter element connected to the at least one further AC voltage connection point, and
the signal transfer unit further includes at least one further switching element configured to establish in at least one operating state a further bypass parallel to the at least one further inverter element.

4. The charging device according to claim 3, wherein the further bypass is arranged between the at least one further AC voltage connection point and the at least one power output.

5. The charging device according to claim 2, wherein the bypass is arranged between the first AC voltage connection point and the at least one power output.

6. The charging device according to claim 2, wherein the signal transfer unit includes a control unit configured to control a switching process of the at least one switching element to generate a signal.

7. The charging device according to claim 2, wherein the at least one switching element includes a MOSFET.

8. The charging device according to claim 1, wherein the signal transfer unit is configured to encrypt a signal transfer.

9. The charging device according to claim 1, wherein the at least one inverter element includes a Schottky diode.

\* \* \* \* \*